United States Patent
Busch et al.

(10) Patent No.: US 6,792,688 B2
(45) Date of Patent: Sep. 21, 2004

(54) PROCESS AND DEVICE FOR DETERMINING THE ALIGNMENT OF A BODY WITH REGARD TO A REFERENCE DIRECTION

(75) Inventors: Dieter Busch, Ismaning (DE); Helmut Ambros, Weichs (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 41 days.

(21) Appl. No.: 09/924,870

(22) Filed: Aug. 9, 2001

(65) Prior Publication Data

US 2002/0017030 A1 Feb. 14, 2002

(30) Foreign Application Priority Data

Aug. 9, 2000 (DE) .................................... 200 13 709 U

(51) Int. Cl.[7] .............................................. G01B 21/22
(52) U.S. Cl. .............................. 33/529; 33/533; 33/1 N; 33/1 PT; 33/645; 33/412
(58) Field of Search ............................... 33/1 N, 1 PT, 33/533, 613, 645, 529, 412, DIG. 1, 632, 502, 638–639, 614, 281–282, 285, 626, 628, 642, 655, 657; 101/216

(56) References Cited

U.S. PATENT DOCUMENTS

| 4,148,013 | A | * | 4/1979 | Finn et al. ..................... 33/655 |
| 4,553,335 | A | * | 11/1985 | Woyton ........................ 33/645 |
| 4,864,148 | A | * | 9/1989 | Lysen et al. ............. 250/559.3 |
| 5,056,237 | A | * | 10/1991 | Saunders ...................... 33/645 |
| 5,077,905 | A | * | 1/1992 | Murray, Jr. ................... 33/412 |
| 5,219,379 | A | * | 6/1993 | Good et al. ................... 33/642 |
| 5,440,389 | A | * | 8/1995 | Drabarek .................... 356/460 |
| 5,771,594 | A | * | 6/1998 | Feichtinger ................. 33/1 PT |
| 5,778,543 | A | * | 7/1998 | Schneider et al. ............ 33/324 |
| 6,049,378 | A | * | 4/2000 | Busch et al. ................ 356/138 |
| 6,212,783 | B1 | * | 4/2001 | Ott et al. .................... 33/1 PT |
| 6,223,102 | B1 | * | 4/2001 | Busch ........................ 700/279 |
| 6,411,375 | B1 | * | 6/2002 | Hinkle et al. ................. 33/645 |
| 6,418,629 | B1 | * | 7/2002 | Oh ............................. 33/1 PT |
| 6,502,320 | B2 | * | 1/2003 | Buckner et al. .............. 33/286 |
| 6,515,294 | B1 | * | 2/2003 | Busch et al. ............. 250/559.3 |
| 6,591,218 | B1 | * | 7/2003 | Lysen ......................... 702/151 |
| 2002/0002777 | A1 | * | 1/2002 | Torr ........................... 33/1 PT |
| 2003/0055536 | A1 | * | 3/2003 | Lysen et al. ................ 700/279 |

* cited by examiner

Primary Examiner—Diego Gutierrez
Assistant Examiner—Yaritza Guadalupe
(74) Attorney, Agent, or Firm—Nixon Peabody LLP; David S. Safran

(57) ABSTRACT

The invention relates to a process and device for determining the alignment, with respect to a reference direction, of a cylindrical body (10) mounted to rotate around its lengthwise axis (22). The device including a position measurement probe (20), which is calibrated to the reference direction, being attached on the end face (12) of the body or on a surface essentially parallel to the end face, which probe gathers measurement data in at least three measurement positions around the lengthwise axis each position of which differs from the other by an angle of rotation of the body, such that one position measurement at a time is being taken. Then the alignment of the body with respect to the reference direction is computed from the determined measurement data.

20 Claims, 5 Drawing Sheets

Angular Position 2

Angular Position 3

PROCESS AND DEVICE FOR DETERMINING THE ALIGNMENT OF A BODY WITH REGARD TO A REFERENCE DIRECTION

BACKGROUND OF THE INVENTION

1. Field of the Invention

This invention relates to a process and device for determining the alignment of a body with respect to a reference direction in which the body, particularly a roller of a printing press, is mounted for rotation around a lengthwise axis.

2. Description of Related Art

It has been suggested that a printing press be modified in order check the alignment of its rollers such that the axes or axis pieces of the rollers are provided with highly-planar end faces or provided with a high-precision adapter as an extension of the axial direction of the roller. Utilizing the end faces of the roller or the adapter attached to the roller the components of the angular alignment of the roller are determined with respect to a reference direction. This is done by means of a two-dimensionally acting angular position transducer, such as an optical gyro, which operates with high precision to determine the angular alignment of the roller with respect to a reference direction.

One problem in this approach is that it is extremely difficult to produce the end faces or the corresponding adapter with the necessary precision. That is, to achieve the required measurement accuracy, the end surfaces or the adapter must be produced with a surface quality which has a roughness measure must be much less than one micron.

SUMMARY OF THE INVENTION

A primary object of this invention is to devise a process and a device for determining the alignment of a body, which is mounted to rotate around its lengthwise axis, such that precise alignment measurements are possible even for roughly fabricated surfaces on the end faces of the body or on a surface, such as a high precision adapter, which is essentially parallel thereto.

This object is achieved by a process and a device described herein. In the process of the invention, precise determination of the alignment of a body depends neither on precisely fabricated end faces of the cylindrical body nor on a precisely fabricated adapter, since possible mis-orientation of the position measurement probe with respect to the lengthwise axis of the body can be reduced or eliminated by the evaluation of several measurement positions.

In a preferred embodiment, the position measurement probe is attached to the end face of the body or to a surface parallel to the end face of the body by means of magnetic forces.

DETAILED DESCRIPTION OF THE INVENTION

Figure 1:
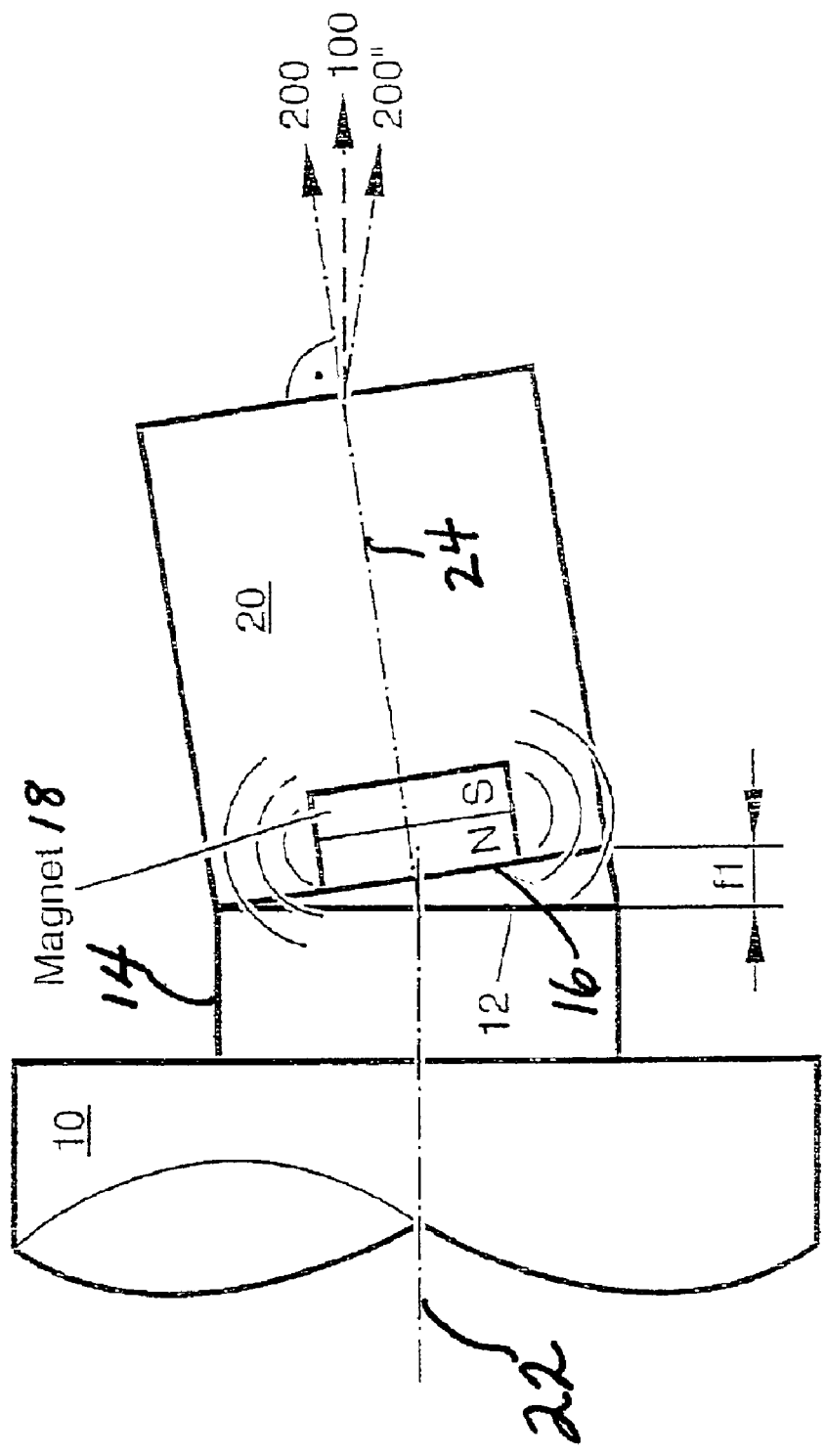
FIG. 1 is a side view of the alignment measurement device of the invention attached to the roller to be measured.

As shown in FIG. 1, a roller 10 has an axis piece 14 with a ground end face 12 to which the position measurement probe 20 is attached. The direction of the lengthwise axis of the roller 10 is labeled 100 in FIG. 1. The inevitable geometric deviations of the end face 12 and the attachment surface 16 of the probe 20 from an ideal surface alignment is illustrated, in a highly exaggerated representation, in FIG. 1 by the amount of error f1, angular deviation of the orientation of the axis 24 or 200 of the position measurement probe 20 with respect to the axial direction 22 and 100 of the rollers arises. Such a deviation occurs generally in the two directions in space which are perpendicular to one another and to the roller axis 100.

In order to provide a firm, but easily detachable, attachment of the probe 20 to the end face 12, the probe 20 is provided with a relatively powerful permanent magnet 18 which is located within the probe housing. In an economical embodiment, the permanent magnet 18 is preferably composed of a neodymium-iron-boron material. This provides the probe 20 with a magnetic foot or a magnetic adapter.

The probe 20 preferably comprises three optical gyros, for example, fiber optic or laser gyros, each of which are capable of forming an optical ring, each optical gyro acquiring a rotation around the axis perpendicular to the plane of the ring. Initially, the probe 20 measures the revolutions around the three axes which are stationary in the initial coordinate system of the probe 20, i.e., the normal line to each plane of the ring. As the actual measurements are achieved however, the probe does not deliver the respective angle of revolution of the roller with respect to these three axes, but rather the respective angle of revolution has been computed by coordinate transformation around three axes which are perpendicular to one another and which are stationary in the initial laboratory coordinate system, i.e., the initial coordinate system of the factory supporting the roller 10 to be measured. With respect to the three axes, the probe 20 is calibrated before the start of the measurement. To achieve this one reference direction is selected which for example can be the orientation of a second roller. The probe 20 then measures the torsion of the roller 10 with respect to this reference direction. The angle of revolution or torsion with respect to the reference direction is hereinafter called the "roll angle" while the angles of revolution with respect to the two other axes of the laboratory coordinate system are called the "pitch angle" and the "yaw angle".

It is hereinafter assumed that the axis 22 corresponds to the reference direction, i.e., the roller 10 is aligned exactly in the reference direction. The roll angle then indicates the torsion of the probe 20 with respect to the axis 22. Further, even if the roller 20 has a mis-orientation, this mis-orientation corresponds, i.e., within the framework of the amount of error f1 and the mis-orientation of the roller 10, approximately to the twisting of the probe with respect to the axis 24. Thus, the coordinate system of the probe 20 and the initial laboratory coordinate system have an axis approximately in common, specifically the axis of the roll angle.

In the following detailed explanation, the terms "pitch", "yaw" and "roll" angles label the instantaneous or current rotation of the measurement probe 20 around three axes which are perpendicular to one another and which are stationary in the initial laboratory coordinate system. Before starting the measurement, the corresponding calibration has been done with respect to the reference direction.

The roller 10 is precisely mounted to rotate around its lengthwise axis 22. The roller 10 is preferably a print roller of a printing press or the roller in a machine for producing films, foils or thin sheets.

The purpose of the measurement is to determine the orientation of the roller 10, i.e., the orientation of its lengthwise axis 22 and 100 with respect to the reference direction in the initial laboratory coordinate system, for example, by the reference direction provided by the orientation of another roller, and such that the horizontal and vertical angle deviation with respect to the given reference direction will be obtained as the measurements are achieved. Initially, assuming ideal contact surfaces between the axis 14 and probe 20, the desired result could be obtained from a single measurement by means of the position measurement probe 20 by using the horizontal or vertical plane in the initial reference coordinate system as the calibration for the "pitch" angle or the "yaw" angle. However, based on the mis-orientation of the probe 20 which is shown exaggerated in FIG. 1, when only a single measurement is taken an unacceptably large systematic measurement error arises, that is, the probe axis 200 deviates in the vertical direction from the roller axis 100, even though the latter is aligned exactly horizontally.

This systematic measurement error is reduced or eliminated by taking at least three measurements at different angles of revolution of the roller 10 and evaluating the results of the measurements taken in the different angular positions in order to determine the final result of the position measurement. To do this, the roller 10 with the measurement probe 20 attached thereto is rotated around its axis 22, then in different rotary positions of the roller 10 measurements of the roll angle, the pitch angle and the yaw angle are taken. The measured roll angle generally corresponds with relative precision to the angle of revolution of the roller 10 and thus of the probe 20 around the axis 22.

The measurement results can be evaluated easily when the measurements are taken in four measurement positions each turned 90° from the previous position. The values of the pitch angle and of the yaw angle measured by the probe 20 are then averaged, the result of which reproduces the true orientation of the roller 10 in a relatively precise manner. This true orientation can be represented as the systematic error resulting from the mis-orientation of the measurement probe 20 with respect to the end face 12 which is shown in vector form and, depending on the angle of revolution, is distributed conically around the true orientation of the roller to be measured. The properties of symmetry of the pertinent cone are used to determine the true angular orientation of the roller 10 in space. In determining the true angular orientation, it can be assumed that the axis of symmetry of the indicated cone of the error distribution reproduces the true orientation of the roller 10. This is apparent in FIG. 1 where reference number 200" identifies the relative orientation of the lengthwise axis 24 of the probe 20, in FIG. 1, when the roller 10, and thus the probe 20, are turned by 180° with respect to the position shown in FIG. 1. The true orientation of the axis 22 of the roller 10, labeled 100, is exactly in the middle between the two orientation directions 200 and 200".

When measurements are taken in four different measurement positions, between which the roller 10 continues to turn 90°, then averaging the results of the measurement positions, which are offset by 180° the desired angle offset of the roller axis can be determined in the horizontal or vertical direction with respect to the reference direction.

Figure 2:
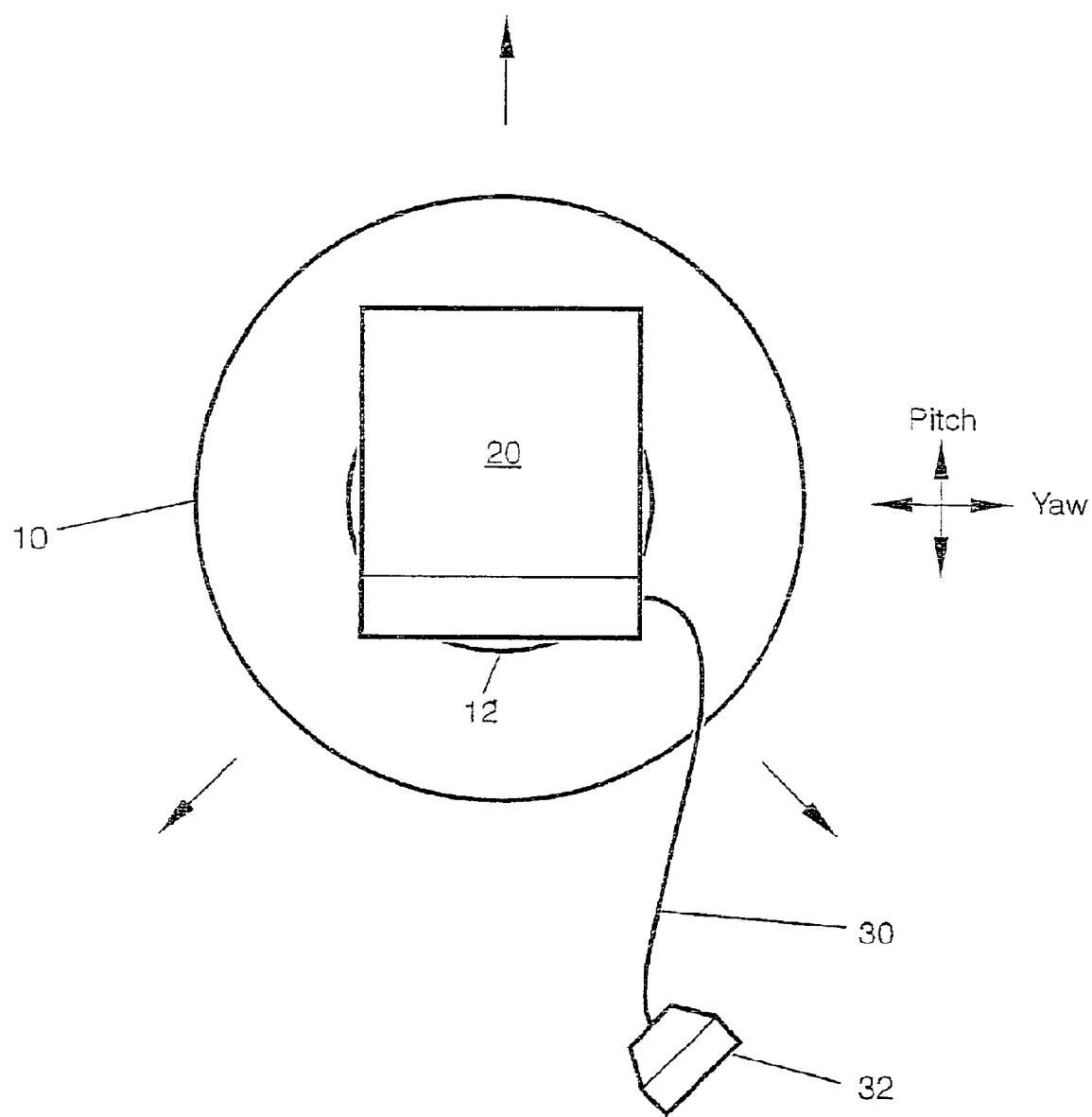
FIGS. 2-4 each show a front view of the arrangement from FIG. 1 with the measurement device in a respective one of different measurement positions.
Figure 3:
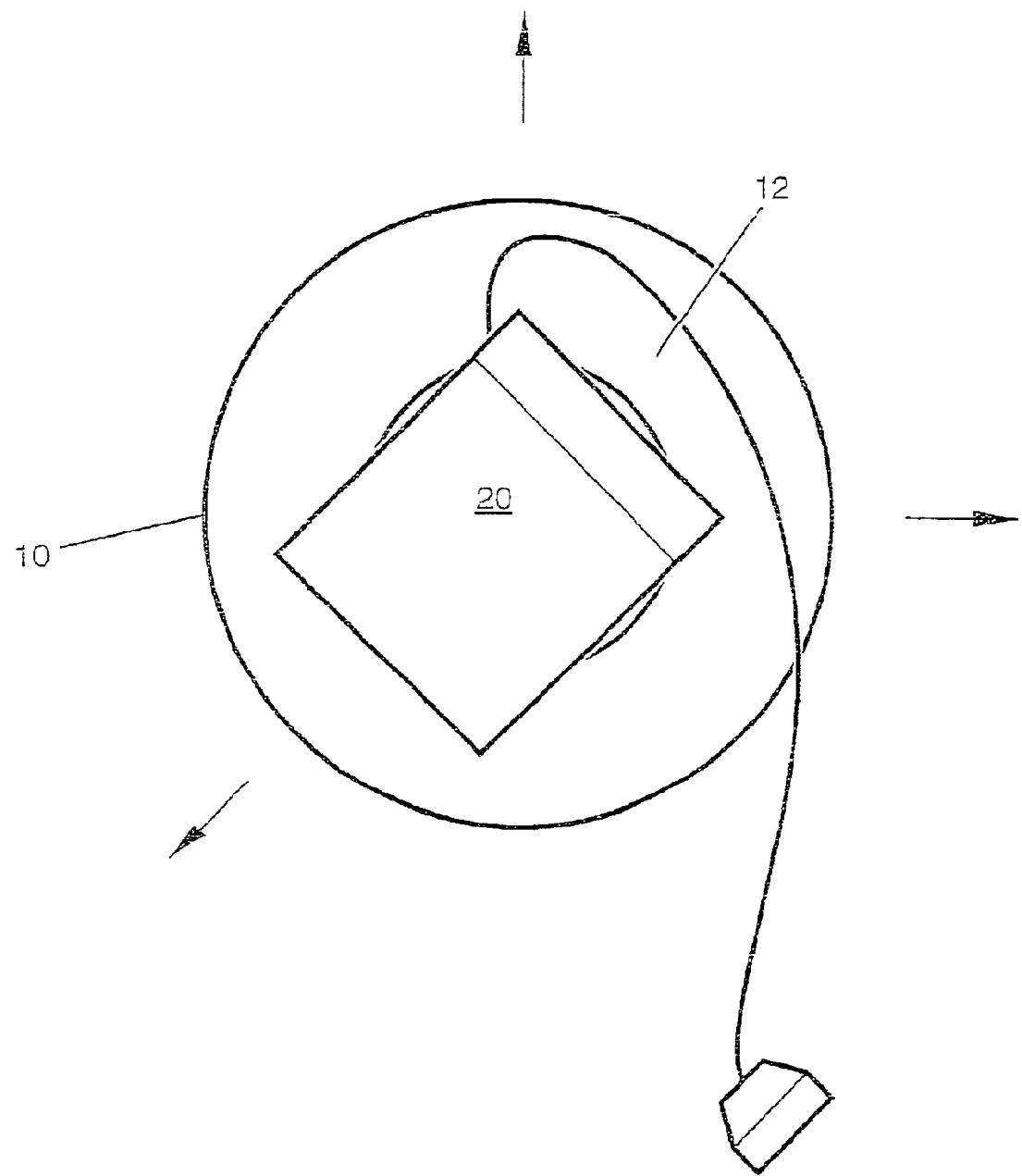
Figure 4:
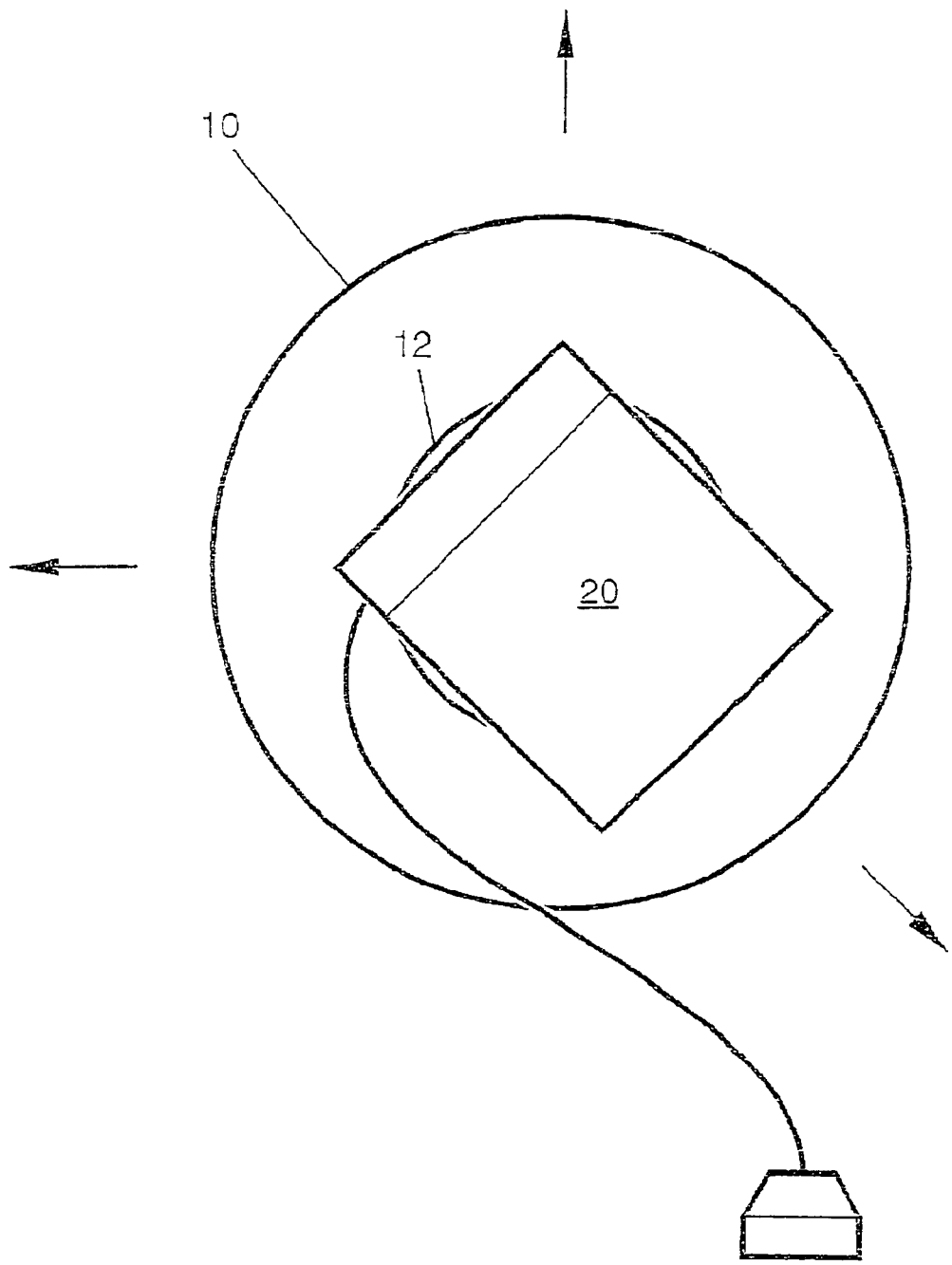

In FIGS. 2 to 4, a measurement process is shown by way of example, in which measurements are taken in three different measurement positions, each figure showing another of the measurement positions. The position measurement probe 20 before the start of the measurements is placed on the end face 12 and is kept securely in place during the measurements by means of the magnet 18.

It can be seen in FIGS. 2 to 4 that the position measurement probe is connected by means of a flexible connecting cable 30 via an interface (plug) 32 which in turn is connected to the evaluation and output unit 33 shown in the FIG. 3. The double arrows in FIGS. 2 to 4 label the reference system of the position measurement probe 20 (i.e., the initial laboratory coordinate system) which remains stationary during rotation of the probe.

Figure 5A:
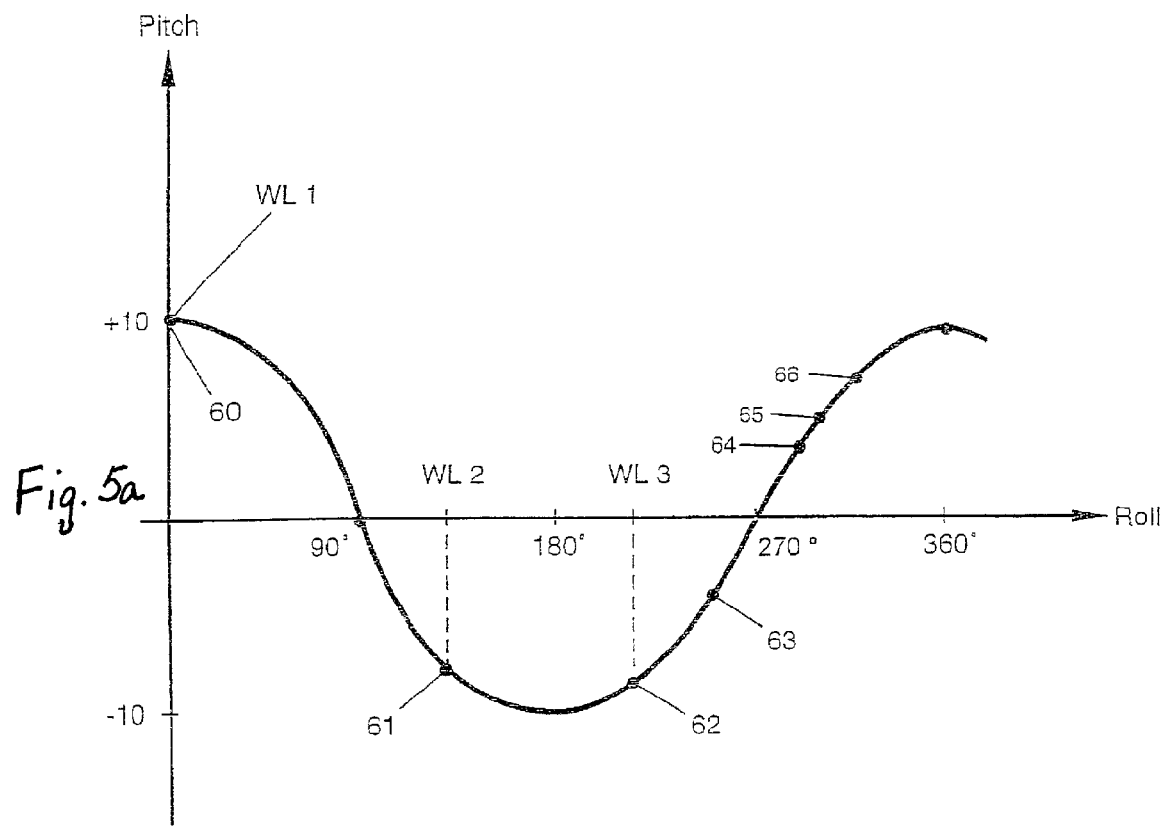
FIGS. 5A & 5B are graphical representations of measurements obtained using the measurement device illustrated in FIGS. 1-4.
Figure 5B:
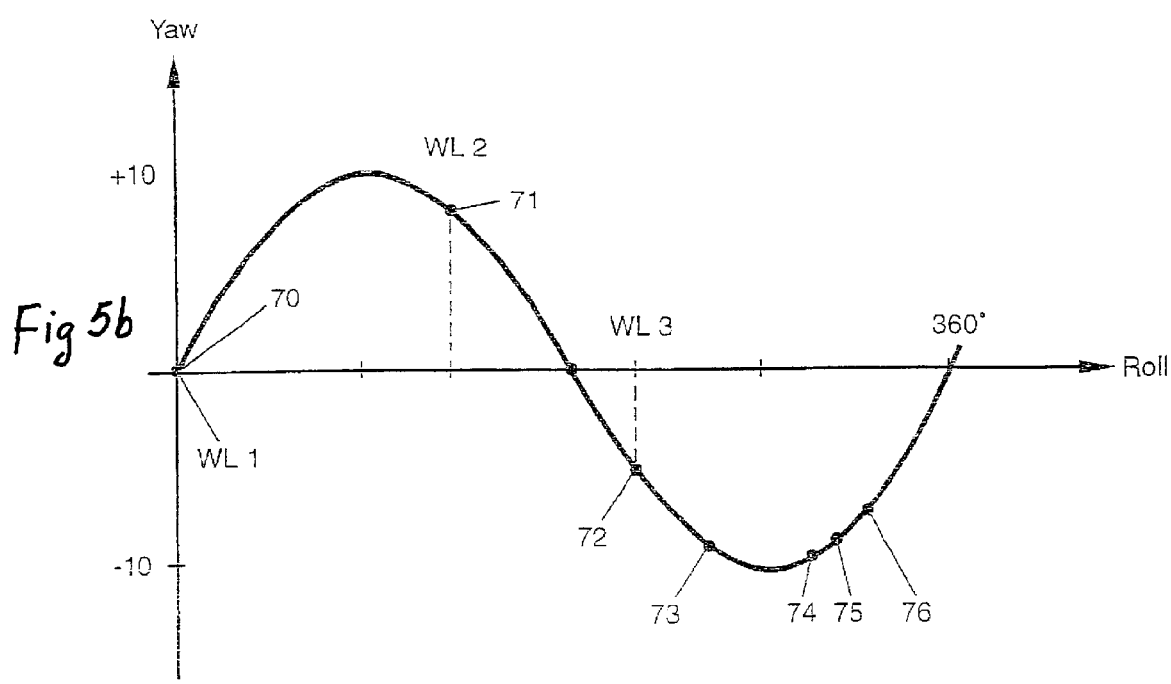

FIGS. 5A and 5B show a sample evaluation of the measurement results, the pitch angle (FIG. 5B) and the yaw angle (FIG. 5A) measured by the probe 20 being plotted over the roll angle measured by the probe. The results obtained by the probe 20 measurement positions shown in FIGS. 2 to 4 are labeled in FIG. 5B with the reference numbers 60, 61 and 62 for the pitch angle and in FIG. 5A with the reference numbers 70, 71 and 72 for the yaw angle. In the evaluation of the measurement results, the basic approximation principle relied upon is that the true value of the mis-orientation, when the roller 10 is rotated with the position measurement probe 20 having an erroneous amount the pitch angle and the yaw angle acquired by the position measurement probe 20 as a function of the acquired roll angle, oscillates sinusoidally or cosinusoidally around the true value, i.e. the horizontal and vertical mis-orientation of the roller axis 22 and 100. This approximation principle applies to small mis-orientations of the measurement probe axis with respect to the roller axis 22. Thus, the average of the pitch angle and the yaw angle and therefore the vertical and horizontal mis-orientation of the roller axis 22 with respect to the reference direction can be easily ascertained from knowledge of the sine and cosine function. In the example shown in FIGS. 5A and 5B, the average is zero both for the pitch angle and yaw angle, i.e. the roller axis 22 shows no mis-orientation with respect to the reference direction. The representation shown in FIGS. 5A and 5B corresponds to the lengthwise axis 24 of the probe 20 rotating around axis 22 on the envelope of the cone.

Generally, the sine curve or the cosine curve is unequivocally determined by three points. In this respect, measurement of the pitch angle and the yaw angle at three different roll angles, i.e. in three different rotary positions of the roller 10, is sufficient to determine the true pitch angle and the yaw angle by the determination of the sine or cosine function fixed by the measurement points. A higher accuracy can be achieved when more measurement points are available. This is suggested in FIGS. 5A and 5B by the measurement points 63 to 66 and 73 to 76. When there are more than three measurement values, the pertinent sine and cosine function is then determined by curve matching or a compensation calculation, for example, the square of the deviations can be minimized.

To achieve a higher measurement accuracy, it is necessary for the probe measurements to be taken in the individual measurement positions within a relatively short time interval so that the calibration of the position measurement probe 20 is not lost. When an even higher precision measurement accuracy is desired, it is necessary to consider the rotation of the earth in the conventional manner.

What is claimed is:

1. Process for determining the alignment of a body mounted to rotate around a lengthwise axis of the body with respect to a reference direction and including a position measurement probe, comprising the steps of calibrating the position measurement probe relative to the reference direction using a coordinate system that is external to the mounted body to be aligned and fixed relative to the location of said body, attaching the measurement probe on the end face of the body or at a longitudinal axis of the body on a surface essentially parallel to the end face of the body, performing position measurements in at least three measurement positions, each of which differs from the others by an angle of rotation of the body around the lengthwise axis of the body, with one position measurement at a time being taken, and using an evaluation means to compute the alignment of the body with respect to the reference direction from the measurement data gathered from the at least three measurement positions relative to said coordinate system.

2. Process as claimed in claim 1, wherein the measurement positions are distributed uniformly over the range of the angle of rotation of 360°.

3. Process as claimed in claim 2, wherein there are four measurement positions between which the difference of the angles of rotation is approximately 90 degrees.

4. Process as claimed in claim 1, wherein the alignment of the body is computed using optimization processes selected from one of curve matching and compensation computation from the position measurement data.

5. Process as claimed in claim 1, wherein the position measurement probe is rotated around three axes, which are stationary in an initial coordinate system of the support of the body, are perpendicular to one another, and define pitch, yaw and roll angles of the body, the position measurement probe being attached to the body such that the roll angle measurement indicates revolution of the probe around an axis approximately parallel to the axis of the body.

6. Process as claimed in claim 5, wherein in each measurement position, the angle of rotation of the body is the roll angle achieved by the position measurement probe.

7. Process as claimed in claim 1, wherein the position measurement probe contains at least one optical gyro.

8. Process as claimed in claim 1, wherein the position measurement probe is attached by means of magnetic forces to the end face of the body or to said surface essentially parallel to the end face of the body.

9. Process as claimed in claim 1, wherein the position measurement probe contains three optical gyros, each of which is capable of forming an optical ring, wherein each optical gyro is used to acquire rotation around an axis perpendicular to a plane of the ring.

10. Device for determining the axial alignment of a cylindrical body mounted to rotate around its lengthwise axis with respect to a reference direction, comprising a position measurement probe calibrated to a reference direction, a means for attachment of the position measurement probe to an end face of the cylindrical body or at a longitudinal axis of the body on a surface essentially parallel to an end face of the cylindrical body, and an evaluation means to compute the alignment of the body with respect to the reference direction using a coordinate system that is external to the mounted body to be aligned and fixed relative to the location of said body, wherein the position measurement probe gathers measurement data from position measurements gathered in at least three measurement positions around the lengthwise axis of rotation such that the measurement positions differ by an angle of rotation of the body around the lengthwise axis.

11. Device as claimed in claim 10, wherein the attachment means performs attachment of the position measurement probe to the end face of the body or said surface which is essentially parallel to the end face of the body by magnetic force.

12. Device as claimed in claim 11, wherein the attachment means is a magnetic foot or magnetic adapter.

13. Device as claimed in claim 12, wherein the attachment means comprises a permanent magnet made of a neodymium-iron-boron material which is situated within the housing of the position measurement probe.

14. Device as claimed in claim 10, wherein the position measurement probe contains at least one optical gyro.

15. Device for determining the alignment of a cylindrical body which is mounted for rotation around a lengthwise axis thereof with respect to a reference direction, comprising a position measurement probe which is calibrated to the reference direction using a coordinate system that is external to the mounted body to be aligned and fixed relative to the location of said body, and a means for magnet attachment of the position measurement probe on an end face of the cylindrical body or at a longitudinal axis of the body on an adapter surface essentially parallel to the end face of the body, wherein the position measurement probe is adapted to gather measurement data from position measurements in at least three measurement positions around said lengthwise axis such that the measurement positions differ by an angle of rotation of the body around the lengthwise axis.

16. Printing press including a cylindrical body comprising a device for determining the alignment of the cylindrical body which is mounted for rotation around lengthwise axis thereof with respect to a reference direction, said device including a position measurement probe which is calibrated to the reference direction using a coordinate system that is external to the mounted body to be aligned and fixed relative to the location of said body, and a means for attachment of the position measurement probe by means of magnetic force on the end face of the cylindrical body or at a longitudinal axis of the body on an adapter surface essentially parallel to the end face of the body, wherein the position measurement probe is adapted to gather measurement data from position measurements in at least three measurement positions around the lengthwise axis such that the measurement positions differ by an angle of rotation of the body around the lengthwise axis.

17. Machine for producing thin sheets including a cylindrical body comprising a device for determining the alignment of the cylindrical body which is mounted for rotation around a lengthwise axis thereof with respect to a reference direction, said device including a position measurement probe which is calibrated to the reference direction using a coordinate system that is external to the mounted body to be aligned and fixed relative to the location of said body, and a means for magnetic attachment of the position measurement probe on an end face of the cylindrical body or at a longitudinal axis of the body on an adapter surface essentially parallel to the end face of the body, wherein the position measurement probe is adapted to gather measurement data from position measurements gathered in at least three measurement positions around said lengthwise axis such that the measurement positions differ by an angle of rotation of the body around the lengthwise axis.

18. A method for determining the alignment of a mounted body mounted to rotate around a lengthwise axis of the body, comprising:

calibrating a position measurement probe relative to a reference direction;

attaching the position measurement probe to the end face of the mounted body;

performing position measurements in at least three measurement positions; and using an evaluation means to compute the alignment of the mounted body with respect to the reference direction based upon the position measurements using a coordinate system which is external to the body and which is moved as the body is moved so as to maintain the same distance and orientation relative to the body for all of the measurement positions.

19. The method of claim 18, wherein the reference direction is the axis of rotation of the mounted roller.

20. An apparatus for determining the axial alignment of a cylindrical body mounted to rotate around its lengthwise axis, comprising:

a position measurement probe calibrated to a measurement direction;

means for attaching the position measurement probe to an end face of the cylindrical body, wherein the position measurement probe gathers measurement data from at least three measurement positions; and means for computing the alignment of the mounted body with respect to the reference direction based upon the measurement data using a coordinate system which is external to the body and which is moved as the body is moved so as to maintain the same distance and orientation relative to the body for all of the measurement positions.

* * * * *